(12) United States Patent
Muto et al.

(10) Patent No.: US 9,473,698 B2
(45) Date of Patent: Oct. 18, 2016

(54) IMAGING DEVICE AND IMAGING METHOD

(71) Applicant: Olympus Corporation, Hachioji-shi, Tokyo (JP)

(72) Inventors: Mika Muto, Tachikawa (JP); Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/696,134

(22) Filed: Apr. 24, 2015

(65) Prior Publication Data

US 2015/0326798 A1 Nov. 12, 2015

(30) Foreign Application Priority Data

May 12, 2014 (JP) .................................. 2014-098761

(51) Int. Cl.
*H04N 5/232* (2006.01)
*H04N 5/262* (2006.01)
*G06T 7/00* (2006.01)
*H04N 5/235* (2006.01)

(52) U.S. Cl.
CPC ......... *H04N 5/23229* (2013.01); *G06T 7/0024* (2013.01); *H04N 5/2356* (2013.01); *H04N 5/2621* (2013.01); *H04N 5/2624* (2013.01); *G06T 2207/10004* (2013.01); *G06T 2207/10148* (2013.01); *G06T 2207/20221* (2013.01)

(58) Field of Classification Search
CPC .. H04N 5/2624; H04N 5/2621; H04N 5/262; G06T 7/0024; G06T 7/00; G06T 2207/10004; G06T 2207/10148; G06T 2207/20221
See application file for complete search history.

(56) References Cited

U.S. PATENT DOCUMENTS

| | | | |
|---|---|---|---|
| 2008/0259176 A1 | 10/2008 | Tamaru | |
| 2012/0062784 A1* | 3/2012 | Van Heugten | ....... H04N 5/2258 348/340 |
| 2015/0085179 A1* | 3/2015 | Van Heugten | ..... H04N 5/23212 348/349 |
| 2015/0244931 A1* | 8/2015 | Ichikawa | ............. H04N 5/2356 348/239 |

\* cited by examiner

*Primary Examiner* — Tuan Ho
(74) *Attorney, Agent, or Firm* — John C. Pokotylo; Straub & Pokotylo (57) ABSTRACT

An imaging device, comprising an imaging section for forming a subject image and obtaining image data, a lens control section for changing focus lens position, and a position correction section for carrying out alignment of a plurality of image data that have been acquired by the imaging section, wherein the position correction section selectively executes local alignment processing for carrying out alignment locally, and global alignment processing for carrying out alignment globally, based on relative focus position between two images that will be combined.

10 Claims, 8 Drawing Sheets

FIG. 8A   NORMAL SHOOTING

FIG. 8B   FOCUS STACKING 1

FIG. 8C   FOCUS STACKING 2

IMAGING DEVICE AND IMAGING METHOD

Benefit is claimed, under 35 U.S.C. §119, to the filing date of prior Japanese Patent Application No. 2014-098761 filed on May 12, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device for acquiring a plurality of image data while changing focus position, and to an imaging method.

2. Description of the Related Art

With an imaging device such as a digital camera, a function is installed for acquiring a plurality of image data, and realizing an image quality that cannot be expressed with a single image. For example, technology is known for acquiring an image with depth of field increased by extracting feature points of a plurality of image data that have been taken by changing focus position, and performing combination for every pixel by weighted average so as to increase a weight of pixels having high sharpness for corresponding pixels between the plurality of images (For example, Japanese Patent No. 4,678,603).

SUMMARY OF THE INVENTION

By combining a plurality of images of changed focus position, it is possible to acquire an image having a large depth of field. In this case, as the number of images is increased, it is possible to acquire a combined image of better image quality. However, the more images that are used in the combination, the more processing time increases.

An object of the present invention is to provide an imaging device and an imaging method that can obtain a combined image of good image quality with a reduced processing time.

An imaging device of the present invention comprises: an imaging section for forming a subject image and obtaining image data; a lens control section for changing focus lens position; and a position correction section for carrying out alignment of a plurality of image data that have been acquired by the imaging section, wherein the position correction section selectively executes local alignment processing for carrying out alignment locally, and global alignment processing for carrying out alignment globally, based on relative focus position between two images that will be combined.

An imaging device of the present invention comprises: an imaging section for forming a subject image and obtaining image data; a lens control section for changing focus lens position; and a position correction section for carrying out alignment of a plurality of image data that have been acquired by the imaging section; an image combination section for combining a plurality of image data that have been acquired by the imaging section; and an in-focus region estimation section for estimating an in-focus region for the image data, wherein the position correction section selectively executes local alignment processing for locally aligning, and global alignment processing for globally aligning, based on the in-focus region for image data that has been estimated by the in-focus region estimation section.

An imaging device of the present invention comprises: an imaging section for forming a subject image and obtaining image data; a lens control section for changing focus lens position; and a position correction section for carrying out alignment of a plurality of image data that have been acquired by the imaging section; an image combination section for combining a plurality of image data that have been acquired by the imaging section; and a combination reference image selection section for selecting a reference image for when image combination is carried out by the image combination section, wherein the position correction section executes local alignment processing in a case where alignment is executed to the reference image that was selected by the combination reference image selection section.

An imaging method of the present invention comprises: forming a subject image using an imaging section, and acquiring image data; changing focus lens position within a photographing lens; carrying out alignment of a plurality of image data that have been acquired by the imaging section; and at the time of the alignment, selecting local alignment processing for carrying out alignment locally, or global alignment processing for carrying out alignment globally, based on relative focus position between two images that will be combined.

DETAILED DESCRIPTION OF THE PREFERRED EMBODIMENTS

An example where a digital camera is adopted as one embodiment of the present invention will be described in the following. This digital camera has an imaging section, with a subject image being converted to image data by this imaging section, and the subject image being subjected to live view display on a display section arranged on the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Also, with this camera, if focus stacking mode has been set the focus position of the photographing lens is sequentially moved, and a plurality of images for focus stacking are acquired. In alignment of a plurality of acquired images, either global alignment processing for correcting positional displacement of the entire image, or local alignment processing for correcting positional displacement of each section within an image is selected and carried out (refer to FIG. 5 and FIG. 6 for details).

With global alignment processing, rapid processing can be carried out because processing is performed for the entire screen, but in a case where the subject is moving, alignment precision for that subject portion is lowered. On the other hand, since local alignment processing is carried out for each section of a screen more processing time is required, but it is possible to carry out high precision alignment even when the subject is moving.

Figure 1:
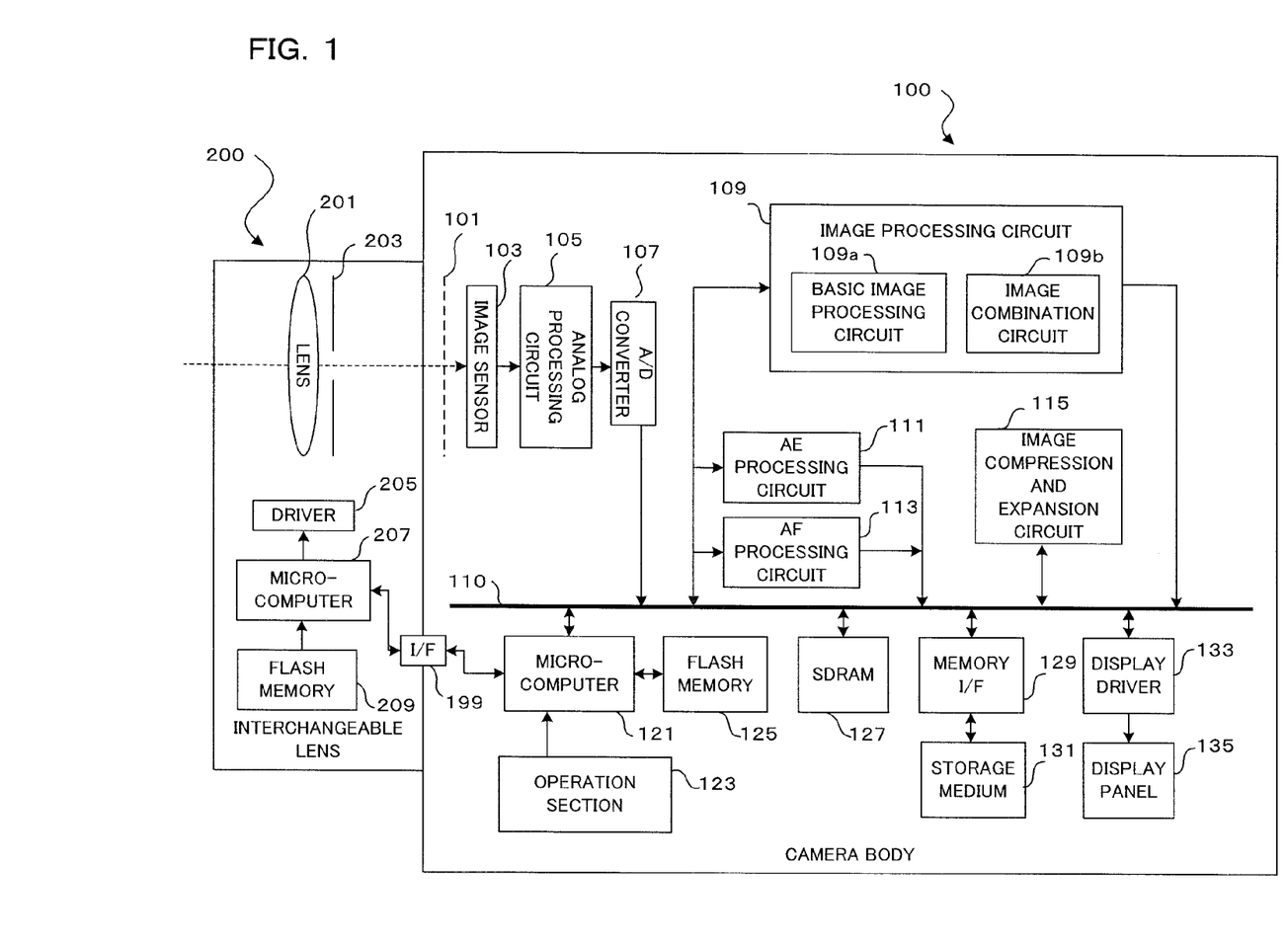
FIG. 1 is a block diagram mainly showing the electrical structure of a camera of one embodiment of the present invention.

FIG. 1 is a block diagram mainly showing the electrical structure of a camera of one embodiment of the present invention. This camera comprises a camera body 100 and an interchangeable lens 200 that can be attached to and removed from the camera body. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 199 between the interchangeable lens 200 and the camera body 100, which will be described later.

The photographing lens 201 is constituted by a plurality of optical lenses (including a focus lens for focus adjustment) for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201.

Also, the photographing lens 201 can be moved in the optical axis direction by the driver 205, with focus position being controlled by moving a focus lens within the photographing lens 201 based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 199 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121. The microcomputer 207 and the driver 205 function as a lens control section for changing focus lens position. This lens control section changes position of the focus lens based on depth of focus or depth of field of the photographing lens (refer to S63 in FIG. 4).

The microcomputer 207 acquires focus position of the focus lens from a focus position detection section (not shown), and acquires zoom position of the zoom lens from a zoom position detection section (not shown). The acquired focus position and zoom position are transmitted to the microcomputer 121 within the camera body 100.

Besides the previously described program, various information such as optical characteristics of the interchangeable lens 200 and adjustment values are stored in the flash memory 209. The microcomputer 207 transmits these various items of information to the microcomputer 121 within the camera body 100. The I/F 199 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 functions as an imaging section for forming a subject image and acquiring image data, and has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel.

The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used.

The image sensor 103 is connected to an analog processing circuit 105, and this analog processing circuit 105 performs wave shaping on the photoelectric conversion signals (analog image signals) that have been read out from the image sensor 103 after reducing reset noise etc., and also carries out gain increase so as to achieve an appropriate brightness.

This analog processing circuit 105 is connected to an A/D converter 107, and this A/D converter 107 performs analog to digital conversion on the analog image signals, and outputs the digital image signals (hereafter referred to as image data) to a bus 110. In this application, raw image data before image processing in the image processing circuit 109 is called RAW data.

The bus 110 is a transfer path for transferring various data, that has been read out or generated inside the camera body 100, within the camera body 100. Besides the previously described A/D converter 107, an image processing circuit 109, AE (Auto Exposure) processing circuit 111, AF (Auto Focus) processing circuit 113, image compression and expansion circuit 115, microcomputer 121, SDRAM 127, memory interface (hereafter referred to as memory I/F) 129, and display driver 133 are connected to the bus 110.

The image processing circuit 109 has a basic image processing circuit 109a for carrying out ordinary image processing, and an image combination circuit 109b for carrying out image combination. When combining a plurality of images, the basic image processing circuit 109a and the image combination circuit 109b are used.

The basic image processing circuit 109a performs optical black (OB) subtraction processing, white balance (WB) correction, demosaicing processing in the case of Bayer data, color reproduction processing, gamma correction processing, color matrix computation, noise reduction (NR) processing, edge enhancement processing etc. on RAW data. With a single photograph, and if a special effect or the like such as art filter or focus stacking is not set, image processing is completed with only processing by the basic image processing circuit 109a.

The image combination circuit 109b carries out various image combination in accordance with a combination mode that is set etc. This image combination circuit 109b functions as an image combination circuit for combining a plurality of image data that have been acquired by the imaging section. Specifically, the image combination circuit 109b carries out combination of image data using a plurality of image data that have been acquired under different conditions such as focus position, aperture value etc.

With this embodiment, as will be described later, a combination mode, such as focus stacking for increasing depth of field, can be set. In the event that focus stacking mode is set, the image combination circuit 109b carries out alignment of a plurality of image data that have been taken at a plurality of focus positions, extracts regions of high sharpness (contrast) of the images, and generates an image having a different depth of field to a single image by combining the high sharpness regions.

Figure 5:
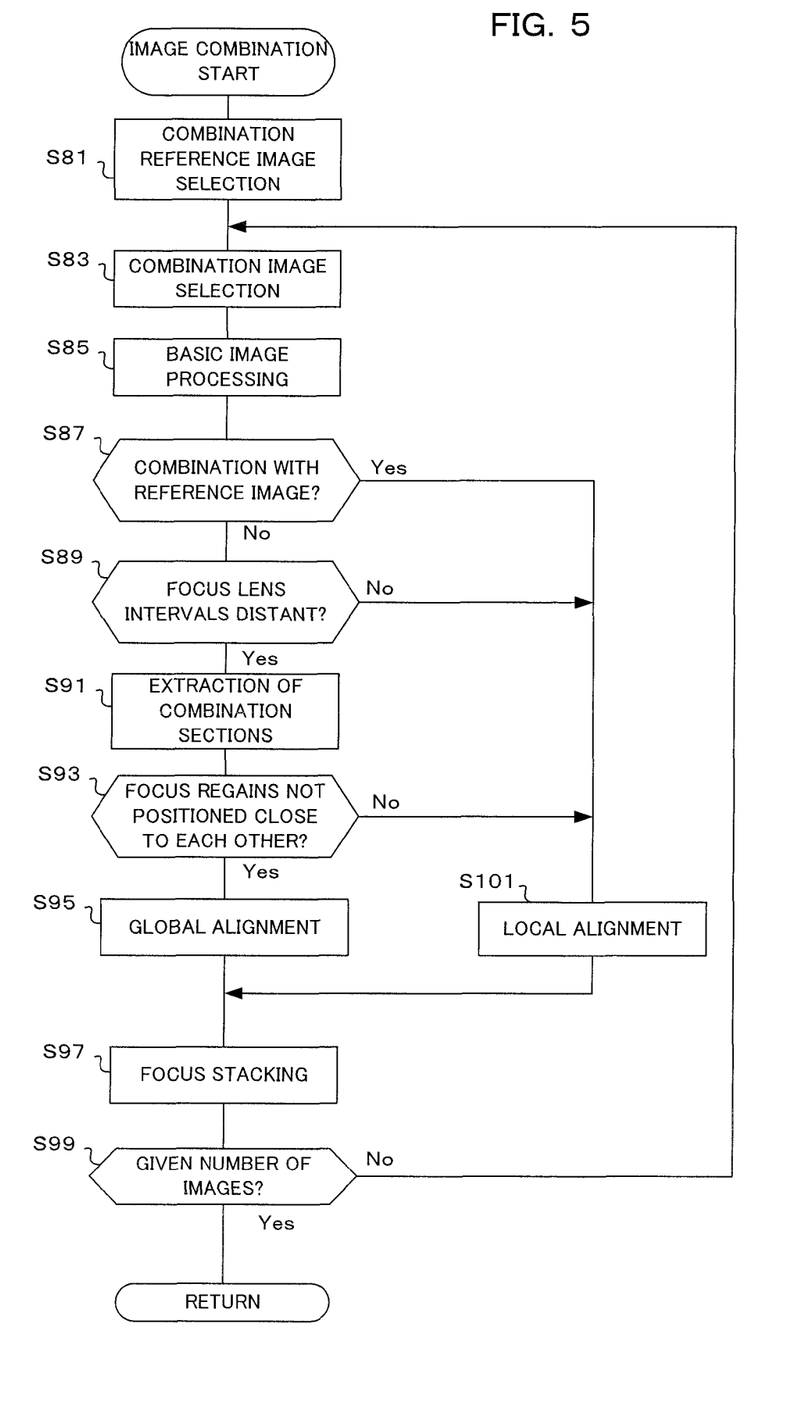
FIG. 5 is a flowchart showing image combination operation of the camera of one embodiment of the present invention.

The image combination circuit 109b functions as a position correction section for carrying out alignment of a plurality of image data that have been acquired by the imaging section (for details refer to S95 and S101 of FIG. 5). Also, this position correction section selectively executes local alignment processing for carrying out alignment locally (refer to S101 in FIG. 5), and global alignment processing for carrying out alignment globally (refer to S95 in FIG. 5), based on relative focus position between two images that will be combined. The position correction section also executes global alignment processing if relative focus positions are set apart (Yes in step S89 in FIG. 5→S95). The position correction section, as well as executing alignment in hardware using the image combination circuit 109b, may also be realized in software by the microcomputer 121, or by cooperative action of the image combination circuit 109 and the microcomputer 121.

The AE processing circuit 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing circuit 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where subject light flux is divided and phase difference sensors are provided on the optical paths, or a phase difference sensor is provided on an image sensor.

The image compression and expansion circuit 115 carries out compression and expansion of image data. Specifically, at the time of storage of image data to the storage medium 131, the image compression and expansion circuit 115 subjects image data that has been read out from the SDRAM 127 to compression in accordance with various compression formats such as JPEG compression in the case of a still picture or MPEG in the case of a movie. The image compression and expansion circuit 115 also carries out expansion of JPEG image data and MPEG image data for image playback display. In the expansion, a file that is stored in the storage medium 131 is read out, and after being subjected to expansion processing, the expanded image data is temporarily stored in the SDRAM 127.

With this embodiment, the JPEG compression system and MPEG compression system are adopted as the image compression system, but the compression system is not limited to this and another compression systems may be used, such as TIFF, H.264 etc. Also, the compression system may be lossless compression or lossy compression.

The microcomputer 121 provides a function as a control section for this entire camera, and performs overall control of various sequences of the camera in accordance with programs stored in the flash memory 125. Besides the previously described I/F 199 an operation section 123 and a flash memory 125 are connected to the microcomputer 121.

Also, the microcomputer 121 functions as an in-focus region estimation section for estimating an in-focus region for image data, based on processing results of the AF processing circuit 113. As has been described, the image combination circuit 109b functions as a position correction section for carrying out alignment of a plurality of image data that have been acquired by the imaging section, and this position correction section selectively executes local alignment processing for aligning locally, and global alignment processing for aligning globally, based on in-focus regions of image data that have been estimated by the in-focus region estimation section (refer to S93, S95 and S101 in FIG. 5). This position correction section executes global alignment processing when the in-focus regions of the image data are set apart (S93 Yes→S95 in FIG. 5).

The microcomputer 121 also functions as a combination reference image selection section for selecting a reference image when carrying out combination of images using the image combination section. As was described previously, the image combination circuit 109b functions as a position correction section for carrying out alignment of a plurality of image data that have been acquired by the imaging section, and in the case where this position correction section executes alignment with the reference image that was selected by the combination reference image selection section, executes local alignment processing (refer to S87 and S101 in FIG. 5). The image combination section also executes combination with the reference image after combination with images other than the reference image has been executed at least once (refer to ST2-ST5 in FIG. 6).

The operation section 123 includes operation members such as various input buttons, like a power supply button, release button, a movie button, playback button, menu button, cross-shaped key, an OK button, and various input keys, and detects operating states of these operation members and outputs the result of detection to the microcomputer 121. The microcomputer 121 executes various sequences according to user operation based on the result of detection of the operation members from the operation section 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is an operation button for designating start or finish of movie shooting, and if the movie button is initially operated movie shooting commences, and movie shooting finishes when it is operated again. The playback button is an operation button for setting and canceling playback mode settings, and if playback mode is set image data of a taken image is read out from the storage medium 131, and a taken image is playback displayed on the display panel 135.

The menu button is an operation button for causing display of menu screens on the display panel 135. It is possible to carry out the various camera settings on the menu screens. As camera settings there are, for example, combination mode, such as focus stacking, and as combination modes, besides focus stacking there are modes such as HDR combination and super-resolution combination.

The flash memory 125 stores a program for executing the various sequences of the microcomputer 121. The microcomputer 121 carries out overall control of the camera based on this program.

The SDRAM 127 is an electrically rewritable volatile memory for temporary storage of image data etc. This SDRAM 127 temporarily stores image data that has been output from the A/D converter 107, and image data that has been processed in the image processing circuit 109 etc.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100. The storage medium 131 functions as an image storage section for storing combined image data.

The display driver 133 is connected to the display panel 135, and reads out from the SDRAM 127 and storage medium 131 to display an image on the display panel 1355 based on image data that has been expanded by the image compression and expansion circuit 115. The display panel 135 is arranged on a rear surface of the camera body 100, and carries out image display. The display panel 135 is arranged on a display surface of an external section of the camera, such as the rear surface, which makes it a display section that is prone to the effects of external light, but it is possible to install a large-sized display panel. As a display section it is possible to adopt various display panels such as a liquid crystal display panel (LCD), TFT, or organic EL etc.

As image display modes of the display panel 135, there are Quickview Display for displaying image data to be stored for only a short time immediately after being taken, playback display of image files for still images and movies that have been stored in the storage medium 131, and movie display such as live view display.

Next, main processing of the camera of this embodiment will be described using the flowcharts shown in FIG. 2 and FIG. 3. The flowcharts shown in FIG. 2 and FIG. 3, and in FIG. 4 and -FIG. 5, which will be described later, are executed by the microcomputer 121 controlling each section in accordance with programs stored in the flash memory 125.

Figure 2:
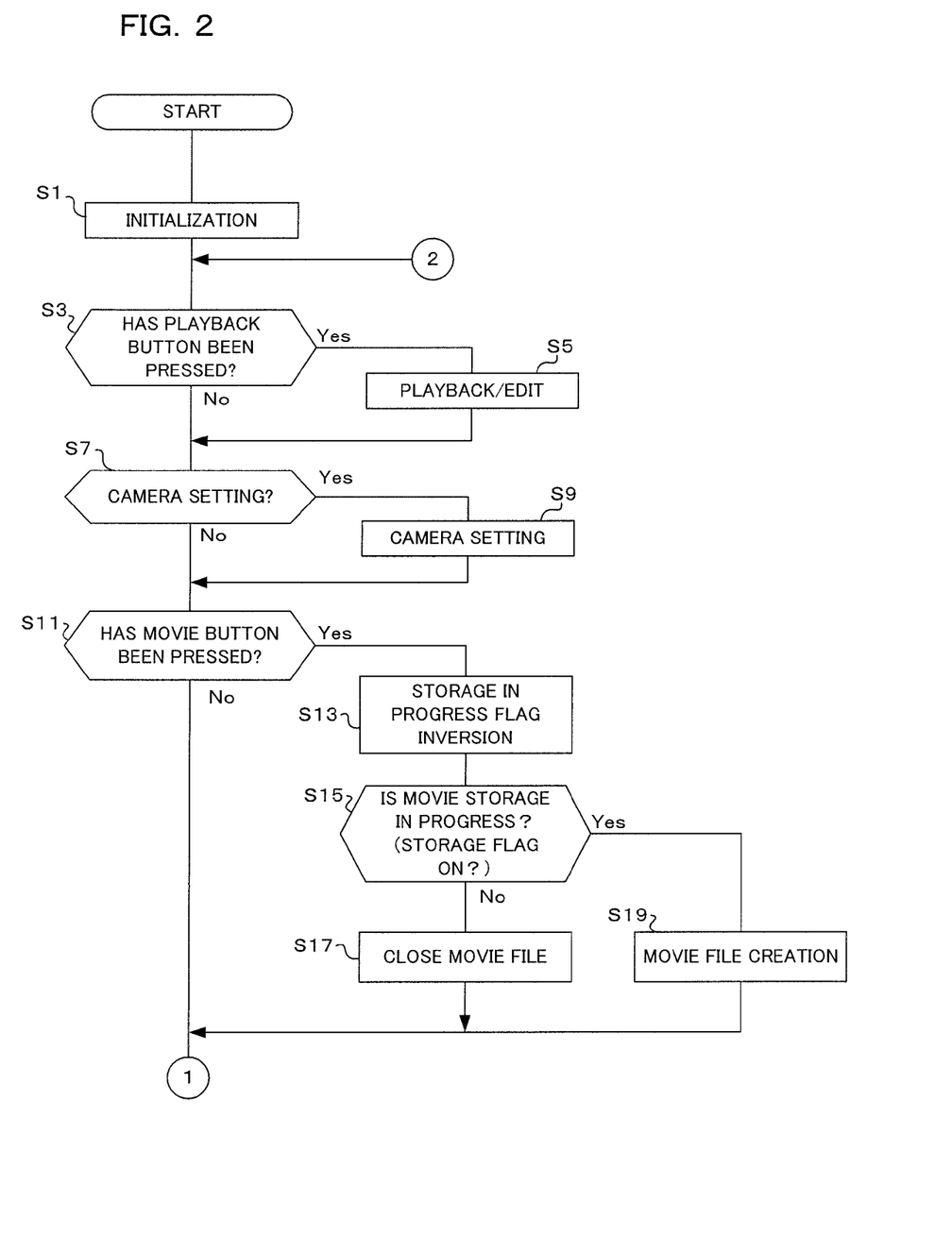
FIG. 2 is a flowchart showing main operation of the camera of one embodiment of the present invention.
Figure 3:
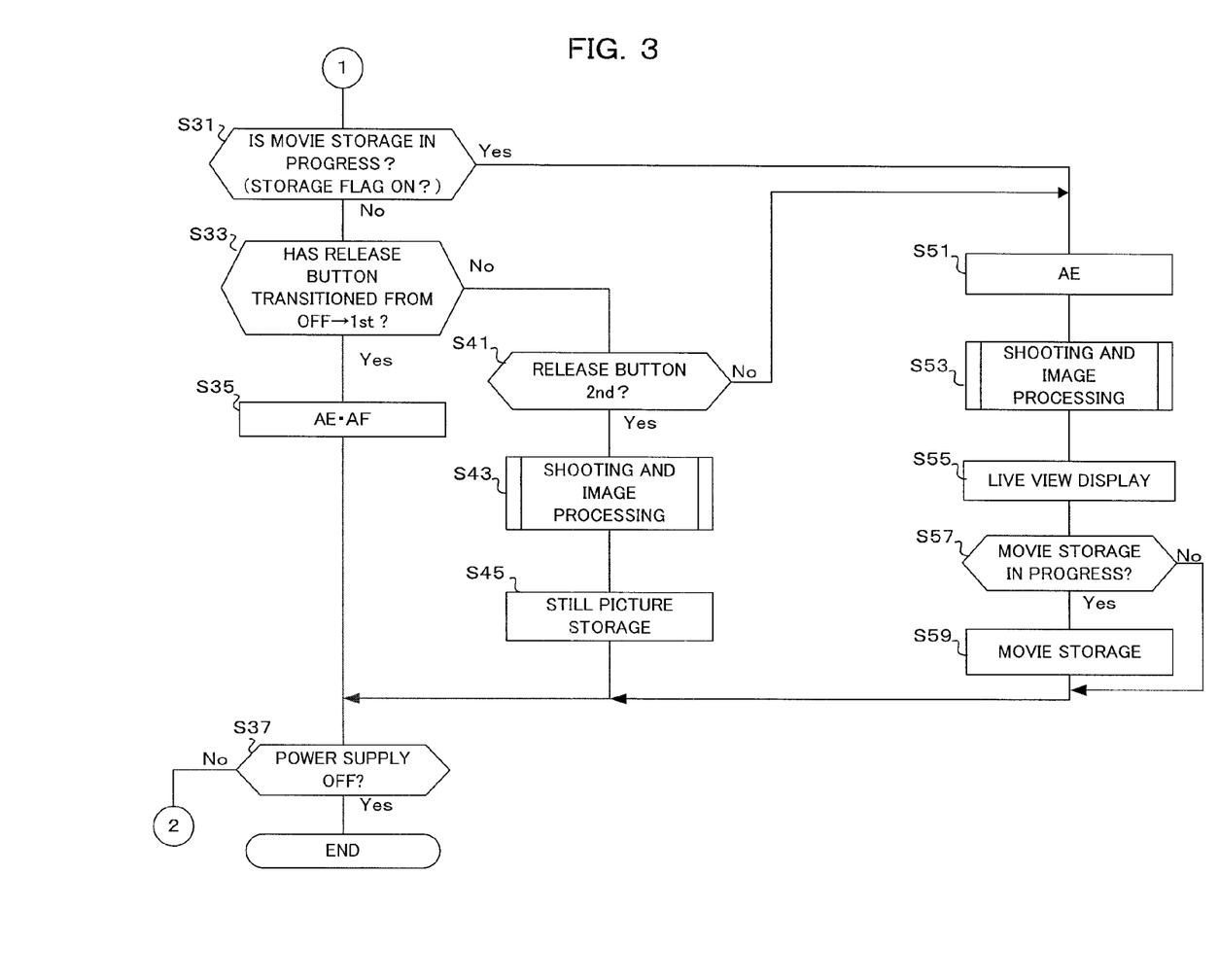
FIG. 3 is a flowchart showing main operation of the camera of one embodiment of the present invention.

If the power supply button within the operation section 123 is operated and the power supply is turned on, operation of the main flow shown in FIG. 2 is started. Once operation has commenced, initialization is first executed (S1). As part of the initialization, mechanical initialization and electrical initialization, such as initialization of various flags etc., are carried out. As one of the various flags, a storage in progress flag indicating whether or not movie storage is in progress is reset to off (refer to Steps S13, S15 and S31).

Once initialization has been carried out, it is next determined whether or not the playback button has been pressed (S3). Here, determination is carried out by detecting the operating state of the playback button within the operation section 123. If the result of this determination is that the playback button has been pressed, playback/editing mode is executed (S5). Here, image data is read out from the storage medium 131, and a table of still images and movies is displayed on the display panel 135. The user selects an image from within the table by operating the cross-shaped key and decides on the image using the OK button. It is also possible to carry out editing of a selected image.

If playback/editing is executed in step S5, or if the result of determination in step S3 was that the playback button had not been pressed, it is determined whether or not camera setting will be carried out (S7). When the menu button within the operation section 123 has been operated, camera setting is carried out on a menu screen. In this step therefore, determination is based on whether or not this camera setting has been carried out.

If the result of determination in step S7 is camera setting, camera setting is carried out (S9). As described previously, it is possible to carry out various camera settings on the menu screens. As camera settings it is possible to set, for example, modes such as normal shooting and focus stacking as shooting modes.

If camera setting has been carried out in step S9, or if the result of determination in step S7 was not camera setting, it is next determined whether or not the movie button has been pressed (S11). Here the microcomputer 121 carries out determination based on operating state of the movie button input from the operation section 123.

If the result of determination in step S11 is that the movie button has been pressed, inversion of the storage in progress flag is next carried out (S13). The storage in progress flag is set to on (1) if movie storage is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that movie storage is not in progress, the movie file is closed (S17). The movie file is closed in this step because the movie button has been pressed and movie shooting is completed. When closing the movie file, the movie file is placed in a state where it can be played back as a movie file by storing a number of frames in a header of the movie file etc., and file writing is completed.

Once the movie file has been closed in step S17, or if a movie file is created in step S19, or if the result of determination in step S11 was that the movie button was not pressed, it is next determined whether or not movie storage is in progress (S31). In this step, similarly to step S15, determination is based on whether the storage in progress flag is on or off.

If the result of determination in step S31 is that movie storage is not in progress, it is next determined whether or not the release button has been pressed halfway, in other words, whether or not the first release switch has changed from off to on (S33). For this determination, the state of the first release switch that is linked to the release button is detected by the operation section 123, and determination is carried out based on the result of detection. If the result of detection is that the first release switch has changed from off to on, the result of determination becomes Yes, while on the other hand if an on state or an off state is maintained the result of determination becomes No.

If the result of determination in step S33 is that the release button has been pressed down half way, then in the case where the first release has transitioned from off an AE/AF operation is executed (S35). Here, the AE processing circuit 111 detects subject brightness based on image data acquired by the image sensor 103, and the microcomputer 121 calculates shutter speed and aperture value etc. for correct exposure based on this subject brightness.

An AF operation is also carried out in step S35. Here, the microcomputer 121 causes the driver 205 to move focus position of the photographing lens 201 by means of the microcomputer 207 inside the interchangeable lens 200, so that a focus evaluation value that has been acquired by the AF processing circuit 113 becomes a peak value. As a result, if the release button is pressed down halfway when movie shooting is not being carried out, focusing of the photographing lens 201 is carried out at that point in time, and the lens is moved to a focus position. After that processing advances to step S37.

If the result of determination in step S31 is that the release button has not transitioned from off to the first release, it is next determined whether or not the release button has been pressed down fully, and the second release switch has been turned on (S41). In this step, the state of the second release switch that is linked to the release button is detected by the operation section 123, and determination is carried out based on the result of detection.

If the result of determination in step S41 is that the release button is pressed down fully and that the second release switch has been turned on, shooting and image processing is carried out (S43). Here, the diaphragm 203 is controlled with the aperture value that was calculated in step S33, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing circuit 105 and the A/D converter 107 is output to the bus 110.

Also, if focus stacking mode is set the focus lens inside the photographing lens 201 is moved, shooting is carried out once a focus position that has been set is reached, and a plurality of image data are acquired.

Once shooting has been completed in step S43, image processing is also carried out. RAW data that has been acquired by the image sensor 103 is read out, and image processing is carried out by the image processing circuit 109. Also, in the case where focus stacking mode has been set, in step S43 focus stacking is carried out using a plurality of image data that has been acquired. Detailed operation of this shooting and image processing will be described later using FIG. 4.

Once shooting and image processing have been carried out, still picture storage is next carried out (S45). Here, image data for a still picture to which image processing has been applied is stored in the storage medium 131. At the time of still picture storage, storage is carried out using a format that has been set (storage format can be set in the camera setting of step S9). In the event that JPEG has been set, the data that has been subjected to image processing is subjected to JPEG compression in the image compression section, and stored. In the case of TIFF format, image data is converted to RGB data and stored in RGB format. Also, in the event that RAW storage is set, if combination is carried out with RAW data that has been acquired by shooting, combined RAW data is also stored. A storage destination for image data may be the storage medium 131 within the camera body, or may be storage to an external device via a communication section (not shown).

If the result of determination in step S41 is that the second release switch was not turned on, or if the result of determination in step S31 was that movie storage is in progress, next an AE operation is carried out (S51). If the determination in previously described step S41 is no, it is a situation where no operation was carried out for the release button, and in this case live view display of step S57, which will described later, is carried out. Also, if the determination in previously described step S31 is Yes, movie storage is in progress. In this step, shutter speed and ISO sensitivity for the electronic shutter of the image sensor 103 in order to carry out live view display or movie shooting at the correct exposure are calculated.

Once AE has been carried out, next, similarly to step S43, shooting and image processing is carried out (S53). Here, the subject image is converted to image data. Specifically, charge storage is performed during an exposure time that is determined by the electronic shutter of the image sensor 103, and image data is acquired by reading out the stored charge once the exposure time has elapsed.

If image data has been acquired using the electronic shutter in step S53, image processing is carried out for the acquired image data. In this step, basic image processing such as WB correction, color matrix calculation, gamma conversion, edge enhancement, noise reduction etc. is carried out by the basic image processing circuit 109a.

If shooting and image processing has been carried out, live view display is next carried out (S55). In this step, live view display is carried out on the display panel 135 using the image data that was subjected to basic image processing in step S53. Specifically, image data was acquired in step S53, and image processing was carried out, and so update of the live view display is carried out using an image that has been subjected to this processing. A photographer can determine composition and shutter speed by observing the live view display.

Once live view display has been carried out in step S55, it is next determined whether or not movie storage is in progress (S57). Here it is determined whether or not the storage in progress flag is on. If the result of this determination is that movie storage is in progress, movie storage is carried out (S59). Here, image data read out from the image sensor 103 is subjected to image processing to give image data for a movie, and stored in a movie file.

If movie storage has been carried out in step S59, if the result of determination in step S57 was that movie storage was not in progress, if still picture storage was carried out in step S45, or if AE/AF was carried out in step S35, it is next determined whether or not the power supply is off (S37). In this step it is determined whether or not the power supply button of the operation section 123 has been pressed again. If the result of this determination is not power off, processing returns to step S3. On the other hand, if the result of determination is power off, a termination operation of the main flow is executed and then the main flow is terminated.

In this way, in the main flow of the one embodiment of the present invention, setting of shooting mode to combine a plurality of image data, such as focus stacking mode, is possible (S9), and when focus stacking mode has been set, in step S43 a plurality of image data are acquired while changing focus lens position, and focus stacking processing is carried out.

Figure 4:
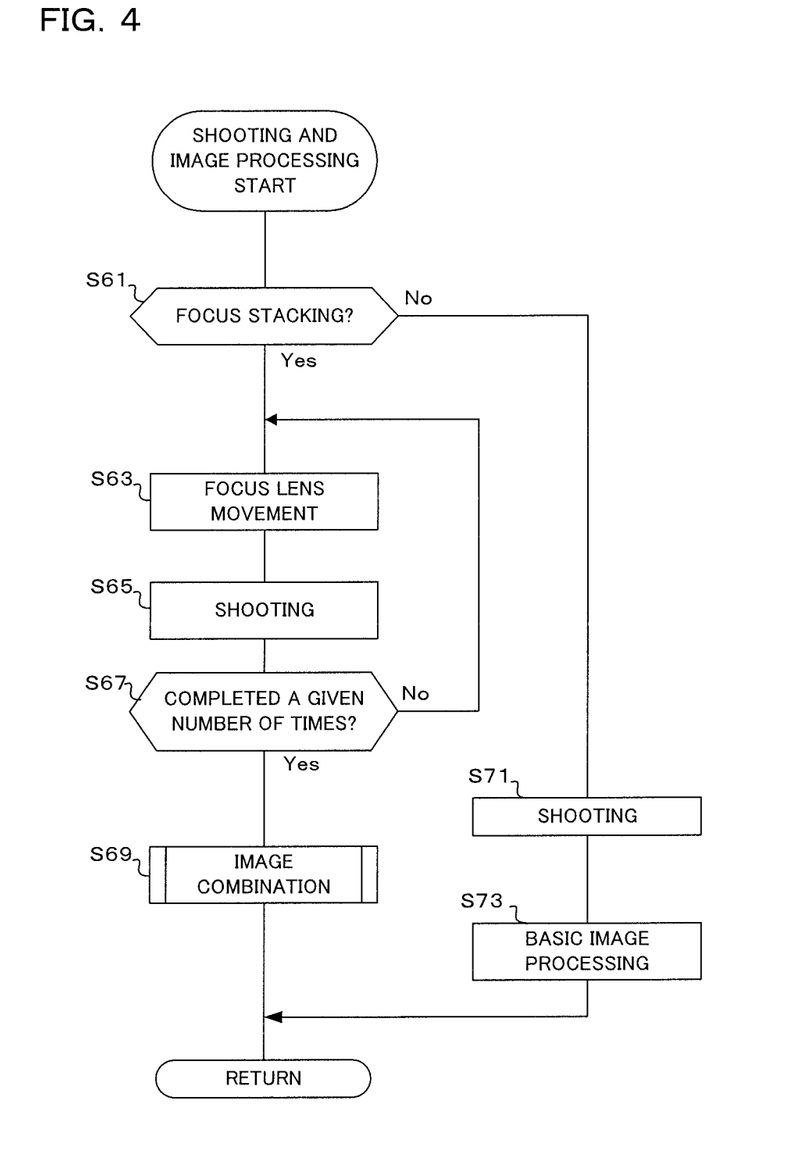
FIG. 4 is a flowchart showing shooting and image processing operations of the camera of one embodiment of the present invention.

Next, detailed operation of the shooting and image processing in step S43 will be described using the flowchart shown in FIG. 4. If the flow for shooting and image processing is entered, it is first determined whether or not focus stacking is set (S61). Focus stacking mode can be set by the user in the camera setting of step S9 (refer to FIG. 2).

If the result of determination in step S62 is that focus stacking mode has not been set, shooting is carried out (S71). Here, the release button is pressed down halfway, shooting is carried out by the image sensor 103 at the exposure control values and focus position that were determined in step S35, and image data is acquired. Once shooting has been carried out, basic image processing is next carried out (S73). Here, the basic image processing circuit 109a applies basic image processing to image data that was acquired in step S71.

On the other hand, if the result of determination in step S61 is that focus stacking mode is set, focus lens movement is carried out (S63). Here, the focus lens is moved by the microcomputer 207 and driver 205 within the interchangeable lens 200, so as to achieve a predetermined focus lens intervals. Focus lens movement amount may be a predetermined fixed movement amount, or may be a value designated by the user by means of the operation section 123, or movement amount may be changed in accordance with shooting conditions. Specifically, focus lens movement amount may be changed based on depth of focus or depth of field of the photographing lens. In a case where movement amount is changed in accordance with shooting conditions, for example, when aperture value is large, depth of field for a single image is large, and so movement amount may be made large.

Once focus lens movement has been carried out, next shooting is carried out (S65). Here, shooting is carried out at an exposure control value that was calculated in step S35, and image data is acquired from the image sensor 103. With still picture shooting, exposure time is controlled by the mechanical shutter 101, while with movie shooting and live view display exposure time is controlled by an electronic shutter of the image sensor 103, but in the case of still purchase shooting also, the exposure time may be controlled by the electronic shutter. Image data that has been acquired by shooting is temporarily stored in the SDRAM 127 etc. together with focus lens position information.

Once shooting has being carried out, it is next determined whether or not shooting has been carried out a given number of times (S67). Here, it is determined whether or not shooting has been carried out for a predetermined number of focus positions (number of taken images). The predetermined number of times may be a predetermined fixed number of times, or may be a number of times designated by the user from the operation section 123, or may be a number of times corresponding to camera state, such as storage capacity of the SDRAM 127. Also, in order to shorten processing time at the time of live view, the number of times a picture is taken may be less than for a still picture. The focus positions in this case can be made focus positions that are thinned out from the focus positions used at the time of the still picture. If the result of this determination is that shooting of a set number of images for focus stacking has not been completed, processing returns to step S63, the focus lenses moved to the next focus position, and shooting for focus stacking is carried out.

If the result of determination in step S67 is that shooting has been completed a given number of times, image combination is carried out (S69). Here, image processing for focus stacking is carried out using the plurality of image data that were acquired in steps S63-S67. In this image processing for focus stacking, image data position is adjusted so as to align the image data, that is, two corresponding images are compared so that two subject images overlap. At the time of this alignment, global alignment and local alignment are selected based on a relative focus position relationship between two images, as will be described later. Once alignment of image data has been carried out, images to be combined are compared, regions of the images where sharpness (contrast) is higher are extracted, and images for regions where this extracted sharpness is higher are combined. As a result, it is possible to generate an image having a different depth of field to a single image. Detailed operation of this image combination will be described later using FIG. 5.

If the image combination has been carried out in step S69, or if the basic image processing has been carried out in step S73, the shooting and image processing flow is completed, and the originating flow is returned to.

In this way, in the shooting and image processing flow, in the event that focus stacking mode is set, shooting is carried out two or more times while moving the focus lens (S63-S67), and once shooting is complete image processing for focus stacking is carried out (S69).

Next, detailed operation of the image combination in step S69 will be described using the flowchart shown in FIG. 5. If the shooting and image processing flow is entered, first selection of a combination reference image is carried out (S81). Here, a combination reference image to be used as a reference when carrying out focus stacking is selected from among a plurality of image data that were taken in step S65 and temporarily stored in the SDRAM 127. As the combination reference image, for example, an image that was taken at the focus lens position at the time of second release, or an image, among a plurality of images, at an intermediate focus lens position etc., is selected. The user may also designate the combination reference image by means of the operation section 123.

If combination reference image selection has been carried out, next combined image selection is carried out (S83). Here, images to be used in combination are selected from among a plurality of image data that have been temporarily stored in the SDRAM 127. It is preferable to select images that were taken at focus lens positions that are distant from each other for the combination. For example, with the example shown in FIG. 6, image data for seven images for focus stacking are acquired (refer to ST1 in FIG. 6), and the fourth image data is made the combination reference image. With this example, the first and fifth images, second and sixth images, and third and seventh images are selected as respective combined images. Further, each of these combined images and the reference combined image are selected as images to be used in combination (refer to ST4).

Once selection of combined images has been carried out, next basic image processing is carried out (S85). Here, the basic image processing circuit 109a applies basic image processing to the selected images.

Once basic image processing has been carried out, it is next determined whether or not it is a reference image to be combined with (S87). Here, it is determined whether or not one image, among two images selected in step S83 to be combined, is a combination reference image that was selected in step S81. If the result of this determination is combination with a reference image, local alignment should be carried out, and so local alignment is carried out in step S101, as will be described later. Specifically, since angle of view of the reference image becomes angle of view of image data after combination, it is possible to prevent degradation in image quality due to positional offset by executing fine alignment using local alignment for image data of the reference image.

If the result of determination in step S87 is not to combine with the reference image, it is determined whether or not there is distance between focus lens positions of images to be combined (S89). Here it is determined whether or not an interval for focus lens position of an image used in combination is a given distance or more away. Information relating to focus lens position used in the determination is focus lens position information at the time of shooting in step S65, and since this information is associatively stored at the time of temporarily storing image data to the SDRAM 127, it is read out, and the determination is based on this information. A threshold value for determination may be a predetermined value. The threshold value may also be set in accordance with movement amount of the focus lens at the time of shooting. The determination in this step may be determination by comparing the focus lens position with a threshold value, or, if a sequence of focus lens positions for shooting is known in advance, may be determination based on what number in the sequence the taken image is.

If the result of determination in step S89 is that the focus lens interval has moved away, next extraction of combined sections is carried out (S91). With focus stacking, since combination of high frequency components is carried out, high frequency components are extracted from within an image, and the extracted pixels are made a combination area.

Once extraction of combination sections has been carried out, it is next determined whether or not in-focus regions are positioned close together (S93). Here, it is determined whether in-focus regions are at positions that are close between images that are used in the combination. For example, an image is divided up into a plurality of blocks, combination areas within respective blocks are integrated, and determination may be based on an integrated value for each block. If an integrated value exceeds a given threshold value, and a difference between integrated values is small, it is determined that an in-focus area is in the same region. The given threshold value may be a predetermined value. If there is in-focus area in the same region, local alignment should be carried out, and so local alignment is carried out in step S101, as will be described later.

If the result of determination in step S93 is that in-focus regions are not positioned close together, global alignment is carried out (S95). Here, positional offset between taken images is corrected by global alignment. Global alignment is processing to correct global movement between two images. Two images may be divided into blocks, amounts of movement towards a coordinate with the lowest correlation value calculated for every block, and the amount of positional offset may be made an average of these values. The number of block divisions may be fewer than the number of divisions with local alignment processing (refer to S101), so as to shorten processing time. This global alignment can appropriately carry out alignment in the case where the entire screen has moved, such as in the case of camera hand shake etc.

On the other hand, if the result of determination in step S87 is that there is combination with the reference image, if the result of determination in step S89 is that focus lens interval is not distant, or if the result of determination in step S93 is that in-focus regions are positioned close together, local alignment is carried out (S101). Here, positional offset between taken images is corrected by local alignment. Local alignment is processing to correct local movement of two images. For example, two images are divided into blocks, movement amounts to a coordinate with the lowest correlation value are calculated for each block, and alignment is carried out to match movement amounts for each block. This local alignment can appropriately carry out alignment for respective subjects, even if subjects have moved.

If global alignment has been carried out in step S95, or if local alignment has been carried out in step S101, focus stacking is carried out (S97). Here, image combination is carried out in order to obtain an effect of enlarging the depth of field. For example, high-frequency components of each image are extracted, and an image having a large depth of field is generated by combining high frequency components. The high-frequency component extraction may use data that has been extracted by the combined section extraction of step S91.

Once focus stacking has been carried out, it is next determined whether or not focus stacking has been carried out a given number of times (S99). Here, it is determined whether or not processing of images for combination has been carried out for the plurality of image data that have been taken. If the result of this determination is that processing has not been carried out a given number of times, processing returns to step S83 and processing for focus stacking continues. On the other hand, if the result of this determination is that the processing has been completed the given number of times, the flow for image combination is completed and the originating flow is returned to.

In this way, in the flow for image combination, when carrying out alignment of two images, either carrying out global alignment or carry not local alignment is selected based on given conditions (refer to S87, S89, S93). As a result it is possible to acquire a combined image of good quality in a reduced processing time. Specifically, local alignment can carry out alignment for individual subjects with high precision, but takes a significant processing time. On the other hand, global alignment cannot carry out alignment of individual images with high precision but can perform the processing rapidly. With this embodiment, since optimum alignment is selected taking into consideration respective conditions of a plurality of images, it is possible to acquire a combined image of good quality in a reduced processing time.

With this embodiment, when selecting alignment three determinations are provided for the case of determining based on whether there is combination with a reference image (S87), the case where determination is based on focus lens interval (S89), and the case where determination is based on in-focus region (S93), but it is also possible to have only a single determination, to have only two determinations, or to have determination that is a combination of other conditions. It is also possible to perform only a single one of the determinations for movie shooting and live view display where processing time is an important factor, or to carry out a plurality of determinations with still pictures shooting where image quality is an important factor.

Next, one example of focus stacking image processing will be described using FIG. 6. With the example shown in FIG. 6, as was described previously, seven taken images are acquired (refer to ST1, and to S65 in FIG. 4). Among the seven images, respective global alignment is carried out for the first and fifth images, the second and sixth images, and the third and seventh images (refer to ST2 and to S95 in FIG. 5).

Once global alignment has been carried out, image combination processing for focus stacking is carried out using respective image combinations (refer to ST3 and to S97 in FIG. 5). As a result of this image combination, three combined images, namely combined image 1', combined image 2' and combined image 3', are obtained. Next, respective local alignment is carried out between each of the combined images 1', 2', and 3' and the reference image 4 (ST4, and S101 in FIG. 5).

Once local alignment has been carried out, image combination processing for focus stacking is carried out using respective image combinations (refer to ST5, and to S97 in FIG. 5). With this image combination the combined image for focus stacking is completed.

Figure 6:
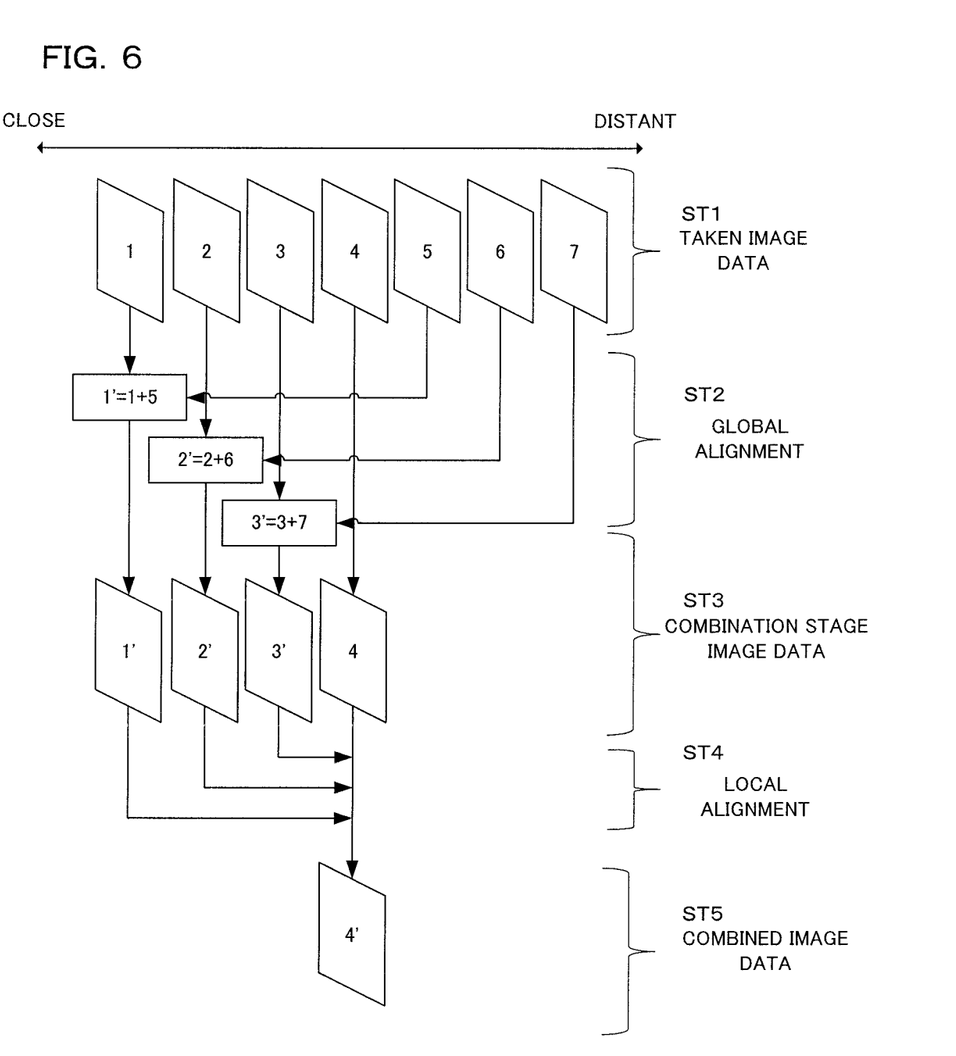
FIG. 6 is a drawing for describing selection and alignment for a combined image, with the camera of one embodiment of the present invention.

In this way, with the example shown in FIG. 6, first global alignment is carried out using images other than the reference image (ST2). At this time, alignment is carried out with combinations of images with relative focus positions that are far apart. Then, after combination for other than the reference image has been executed at least once (ST3), global alignment is carried out with the reference image (ST4) and focus stacking is executed (ST5).

Figure 7A:
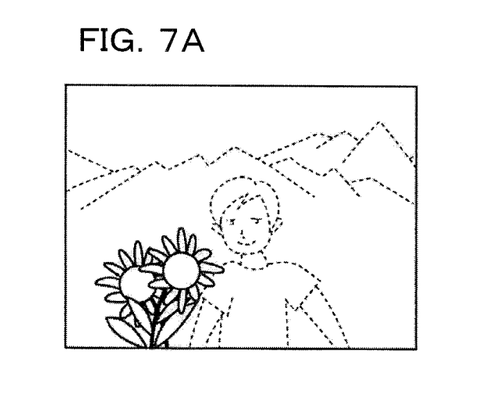
FIG. 7A-FIG. 7D are drawings showing one example of a focus stacking image, with the camera of one embodiment of the present invention.
Figure 7B:
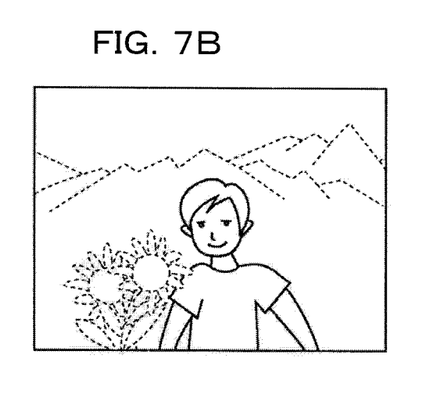
Figure 7C:
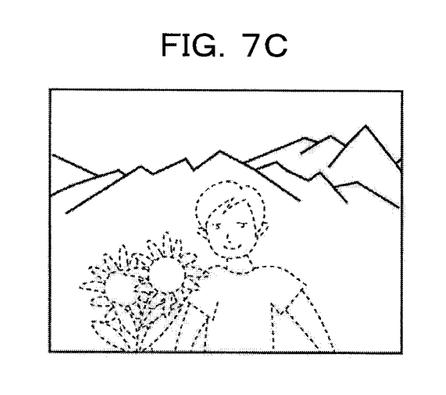

Next, a plurality of images and one example of a combined image for focus stacking generated from these images is shown in FIG. 7A-FIG. 7D. FIG. 7A-FIG. 7C show examples of images taken while varying focus lens position (refer to S63-S67 in FIG. 4), with FIG. 7A focused on a flower that is closest to the camera, FIG. 7B focused on a person who is in the mid-distance, and FIG. 7C focused on mountains that are furthest away. In the drawings, dashed lines represent being out of focus, and solid lines represent being in focus.

Figure 7D:
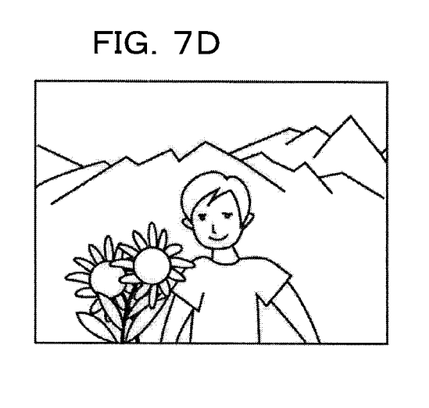

FIG. 7D shows an example of an image created by focus stacking of FIG. 7A-FIG. 7C. With this example, by carrying out focus stacking, it is possible to create an image that is respectively focused on the flower, that is closest, the person in the mid-distance, and the mountains that are far way.

Figure 8A:
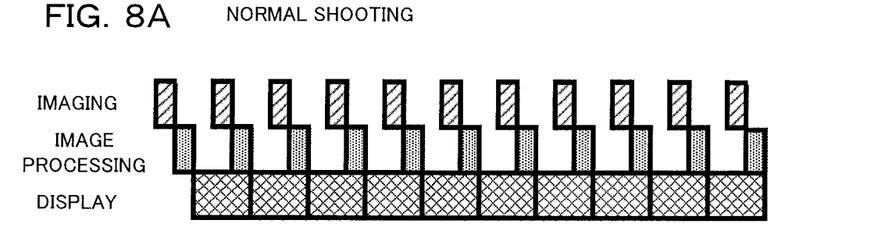
FIG. 8A-FIG. 8C are drawings for describing display at the time of normal shooting and at the time of focus stacking, with the camera of one embodiment of the present invention.

Next, a relationship between imaging and display, for a case where focus stacking and the case where normal shooting is carried out, will be described using FIG. 8A-FIG. 8C. With this example, a case where live view display is carried out is shown (refer to S53 and S55 in FIG. 3). In each drawing, the horizontal direction shows flow of time, while the vertical direction shows respective processing such as image processing. FIG. 8A shows when carrying out normal shooting. At the time of normal shooting, imaging is carried out, image processing is carried out on image data that has been acquired as a result of this imaging, and a live view image is displayed on the display panel 135.

Figure 8B:
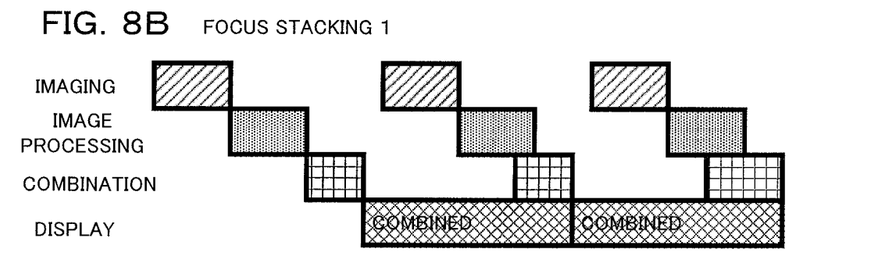

FIG. 8B shows focus stacking 1. With focus stacking 1, imaging is carried out, image processing is carried out on image data that has been acquired as a result of this imaging, and once image processing has been carried out focus stacking is carried out. At the time of focus stacking, combination is performed using a given number of images before and including the previously taken image. Next, a live view image is displayed on the display panel 135 using a focus stacking image. Compared to live view display at the time of normal shooting that was shown in FIG. 8A, with focus stacking 1 it is possible to display an image having a large depth of field as a result of combining a plurality of images.

Figure 8C:
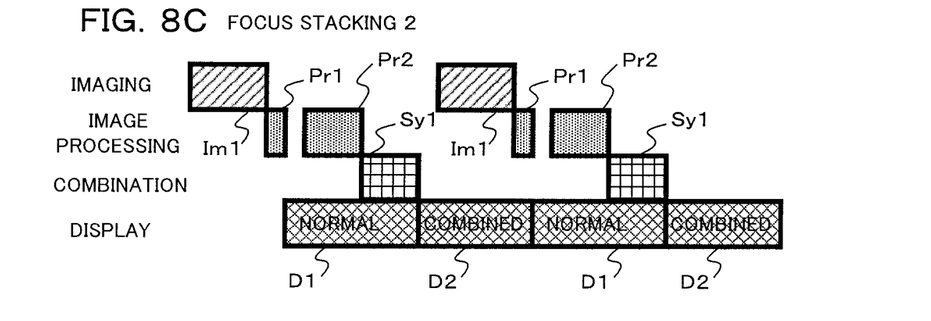

FIG. 8C shows focus stacking 2. Focus stacking 2 alternately displays an image that is the same as at the time of normal shooting, and an image resulting from focus stacking. Specifically, if imaging is carried out (refer to Im1), image processing is carried out on image data that has been acquired by this imaging (refer to Pr1), and normal live view display is carried out on the display panel 135 using this image data that has been subjected to screened processing. Also, if image processing for focus stacking (refer to Pr2) and focus stacking (refer to Sy1) are carried out on image data that has been acquired by imaging, live view display using a focus stacking image is carried out on the display panel 135 using image data that has been subjected to this focus stacking (refer to D2). With this example shown in FIG. 8C, since live view display at the time of normal shooting and an image resulting from focus stacking are alternately displayed, it is possible to easily confirm the effect of focus stacking.

Focus stacking 1 and focus stacking 2 may be designated by the user operating the operation section 123, or only either one of focus stacking 1 and focus stacking 2 may be carried out.

As has been described above, one embodiment of the present invention has a position correction section for carrying out alignment of a plurality of image data that have been acquired by an imaging section, and this position correction section selectively executes local alignment processing for carrying out local alignment, and global alignment processing for carrying out global alignment, based on relative focus position between two images that will be combined (refer, for example, to S87-S95 and S101 in FIG. 5, etc.). Also, one embodiment of the present invention has an in-focus region estimation section for estimating an in-focus region of image data (refer, for example, to S93 in FIG. 5), and the position correction section selectively executes local alignment processing for carrying out local alignment, and global alignment processing for carrying out global alignment, based on an in-focus region for the image data that has been estimated by the in-focus region estimation section (refer, for example, to S93, S95, S101 etc. in FIG. 5). Also, one embodiment of the present invention has a combination reference image selection section for selecting a reference image for when carrying out combination of images using the image combination section, and the position correction section executes local alignment processing in the case of executing alignment with a reference image that has been selected by the combination reference image selection section (refer, for example, to S78 Yes, and S101 etc., in FIG. 5). In this way, since processing for position correction is changed depending on the situation, it is possible to obtain a combined image of good quality in a reduced processing time.

Also, one embodiment of the present invention has an image acquisition step for forming a subject image using an imaging section and acquiring image data (for example, S65 in FIG. 4), a lens control step for changing focus lens position within a photographing lens (for example, S63 in FIG. 4), and a position correction step for carrying out alignment of a plurality of image data that have been acquired by the images section (for example, S95 and S101 in FIG. 5), and this position correction step selectively executes local alignment processing for carrying out local alignment (for example, S101 in FIG. 5), and global alignment processing for carrying out global alignment (for example, S95 in FIG. 5), based on relative focus position between two images that are to be combined (for example, S87, S89 and S93 in FIG. 5). In this way, since processing for position correction is changed depending on the situation, it is possible to obtain a combined image of good quality in a reduced processing time.

With one embodiment of the present invention, it is possible to carry out focus stacking both at the time of still pictures shooting and at the time of movie shooting and live view display (S43 and S53 in FIG. 3), but it is also possible to carry out focus stacking with only one of still picture shooting or movie shooting/live view display.

Also, with one embodiment of the present invention, the position correction section selects either to carry out global alignment processing or to carry out local alignment processing based on whether combination with a reference image is carried out (S87 in FIG. 5), where the focus lens intervals are far apart (S89 in FIG. 5), or whether an in-focus region is not close (S93 in FIG. 5), but it is also possible to select processing based on other conditions, for example, such as image resolution after combination.

Also, with one embodiment of the present invention, the image processing circuit 109, AE processing section 111 and AF processing circuit 113 are constructed separately from the microcomputer 121, but some or all of these sections may be constituted by software, and executed by the microcomputer 121.

Further, with one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any of the above described types of devices, it is possible to apply the present invention as long as it is a device for acquiring a plurality of images, and, after alignment, carrying out image combination.

Also, with one embodiment of the present invention shooting is carried out while changing focus lens position of the camera, to thus acquire a plurality of image data, but this is not limiting, and it is also possible to apply the present invention to a program that carries out alignment using input of a plurality of image data that have been acquired while changing focus lens position.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an imaging section which forms a subject image and obtains image data;
a lens control section which changes a focus lens position; and
a position correction section which carries out alignment of a plurality of image data that have been acquired by the imaging section;
wherein the position correction section selectively executes local alignment processing for carrying out alignment locally, and global alignment processing for carrying out alignment globally, based on relative focus position between two images that will be combined.

2. The imaging device of claim 1, wherein:
the lens control section changes position of the focus lens based on depth of focus or depth of field of the photographing lens.

3. The imaging device of claim 2, wherein:
the position correction section executes global alignment processing if relative focus positions are far apart.

4. An imaging device, comprising:
an imaging section which forms a subject image and obtains image data;
a lens control section which changes a focus lens position; and
a position correction section which carries out alignment of a plurality of image data that have been acquired by the imaging section;
an image combination section which combines a plurality of image data that have been acquired by the imaging section; and
an in-focus region estimation section which estimates an in-focus region for the image data;
wherein the position correction section selectively executes local alignment processing for locally aligning, and global alignment processing for globally aligning, based on the in-focus region for image data that has been estimated by the in-focus region estimation section.

5. The imaging device of claim 4, wherein:
the position correction section executes the global alignment processing when in-focus regions of the image data are far apart.

6. An imaging device, comprising:
an imaging section which forms a subject image and obtains image data;
a lens control section which changes a focus lens position; and
a position correction section which carries out alignment of a plurality of image data that have been acquired by the imaging section;
an image combination section which combines a plurality of image data that have been acquired by the imaging section; and
a combination reference image selection section which selects a reference image for when image combination is carried out by the image combination section;

wherein the position correction section executes local alignment processing in a case where alignment is executed to the reference image that was selected by the combination reference image selection section.

7. The imaging device of claim 6, wherein:
the image combination section executes combination with the reference image after combination with other than the reference image has been executed at least once previously.

8. The imaging device of claim 1, wherein:
the position correction section selects the global alignment processing, or the local alignment processing, based on image resolution after combination.

9. An imaging method comprising:
forming a subject image using an imaging section, and acquiring image data;
changing focus lens position within a photographing lens;
carrying out alignment of a plurality of image data that have been acquired by the imaging section; and
at the time of the alignment, selecting local alignment processing for carrying out alignment locally, or global alignment processing for carrying out alignment globally, based on relative focus position between two images that will be combined.

10. A non-transitory computer-readable medium storing a computer program for controlling an imaging device, the program comprising steps of:
forming a subject image using an imaging section, and acquiring image data;
changing focus lens position within a photographing lens;
carrying out alignment of a plurality of image data that have been acquired by the imaging section; and
at the time of the alignment, selecting local alignment processing for carrying out alignment locally, or global alignment processing for carrying out alignment globally, based on relative focus position between two images that will be combined.

* * * * *